United States Patent
Williams (10) Patent No.: US 9,895,724 B2
(45) Date of Patent: Feb. 20, 2018

(54) PNEUMATIC SWEEPING SYSTEM

(71) Applicant: Toyota Motor Engineering & Manufacturing North America, Inc., Erlanger, KY (US)

(72) Inventor: Dale R. Williams, Cambridge (CA)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 552 days.

(21) Appl. No.: 14/567,007

(22) Filed: Dec. 11, 2014

(65) Prior Publication Data

US 2016/0167091 A1 Jun. 16, 2016

(51) Int. Cl.
*B08B 5/02* (2006.01)
*B08B 3/00* (2006.01)
*B08B 3/02* (2006.01)
*B08B 15/02* (2006.01)
*B23Q 11/00* (2006.01)

(52) U.S. Cl.
CPC .......... *B08B 5/02* (2013.01); *B08B 3/00* (2013.01); *B08B 3/02* (2013.01); *B08B 15/02* (2013.01); *B23Q 11/0042* (2013.01); *B08B 2203/0229* (2013.01)

(58) Field of Classification Search
CPC ..... B08B 5/02; B08B 3/00; B08B 2203/0229; B08B 15/02; B08B 3/02; B23Q 11/0042
See application file for complete search history.

(56) References Cited

U.S. PATENT DOCUMENTS 4,087,320 A * 5/1978 Danahy .................. B65G 45/22
 134/122 R
6,035,996 A * 3/2000 Swift ..................... B65G 45/22
 198/495

(Continued)

FOREIGN PATENT DOCUMENTS

CN 103057931 A 4/2013
CN 202897466 U 4/2013

OTHER PUBLICATIONS

Air Knives Cleaning Dirty Conveyor Belt; Flow Nex Ltd.; Dec. 12, 2012; 0:02 of 0:31; [retrieved Dec. 10, 2014]; retrieved from the Internet <https://www.youtube.com/watch?v=ku4rJDjCedo> in 1 page.

(Continued)

*Primary Examiner* — Alexander Markoff
(74) *Attorney, Agent, or Firm* — Christopher G. Darrow; Darrow Mustafa PC (57) ABSTRACT

A method and system for removing loose impediments from a surface in a manufacturing setting. The surface may be where a widget is processed. As the widget is processed, loose impediments may fall onto the surface. The surface may be transported to a cleaning station where at least one nozzle directs a stream of fluid onto the surface to displace the loose impediments. A container may be provided adjacent to the surface to receive the loose impediments displaced from the surface. The at least one nozzle may continuously direct the stream of fluid onto to surface so long as the surface is present at the cleaning station. When the surface is no longer present at the cleaning station, the at least one nozzle may be deactivated.

22 Claims, 4 Drawing Sheets

(56) References Cited

U.S. PATENT DOCUMENTS

| | | | |
|---|---|---|---|
| 6,206,175 B1 * | 3/2001 | Tschantz | B65G 45/22 198/493 |
| 6,260,231 B1 * | 7/2001 | Bybee | F26B 5/14 15/309.2 |
| 2009/0095172 A1 * | 4/2009 | Madgar | B05B 13/0221 101/118 |
| 2009/0223015 A1 * | 9/2009 | Naide | B08B 5/023 15/345 |
| 2013/0015105 A1 | 1/2013 | Kuzmin et al. | |
| 2013/0180075 A1 * | 7/2013 | Ficarra | B24C 1/003 15/322 |
| 2014/0230660 A1 * | 8/2014 | He | A47J 27/14 99/325 |

OTHER PUBLICATIONS

Lowerator De-Ionized Air Rinser; [retrieved Dec. 10, 2014]; retrieved from the Internet: <http://www.sentryequipment.com/Products/Machinery.aspx>, in 1 page.

* cited by examiner

PNEUMATIC SWEEPING SYSTEM

TECHNICAL FIELD

The present disclosure relates to a method and apparatus for removing debris from a manufacturing assembly line and, specifically, a pneumatic sweeping system for removing and collecting debris from an assembly line station surface.

BACKGROUND

In industrial manufacturing plants, a common problem that arises is loose impediments falling onto the ground. Manufacturing plants must employ workers to constantly be looking out for debris on the plant floor. If the loose impediments are left unchecked, many of the vehicles operating in the plant, whether they are autonomously guided vehicles or push-carts, will become obstructed and may cause manufacturing to be shut down until these vehicles are repaired. This problem is exacerbated when a race-track type production line system is employed, since the whole production line is shut down and no products can be produced if a vehicle becomes obstructed.

The present disclosure addresses this problem. By removing and collecting the loose impediments from the surface of the work station, the likelihood of the vehicle becoming obstructed is lessened and, therefore, the likelihood of manufacturing being stopped is lessened.

SUMMARY

A system and method for removing loose impediments from a surface and collecting the loose impediments is disclosed.

In one example, a method of removing loose impediments from an upwardly facing surface moving along a production line and configured to support a product element is disclosed. The method may comprise sensing a condition indicating a presence of the upwardly facing surface at a cleaning station. The cleaning station may include a container that is located adjacent to the upwardly facing surface and defining an opening angled with respect to the upwardly facing surface. The method may also comprise activating at least one nozzle located at the cleaning station and positioned at a height above the upwardly facing surface. The at least one nozzle may direct a stream of fluid from the at least one nozzle onto and across the upwardly facing surface and displacing any loose impediments from the upwardly facing surface into the container via the fluid directed across the upwardly facing surface. The method may also comprise determining the condition is no longer being sensed. The method may also comprise deactivating the at least one nozzle.

In another example, a system for removing loose impediments from a work station is disclosed. The system may comprise a work station having an upwardly facing surface configured to support a product element. The work station may move along a production line including a cleaning station. The cleaning station may comprise at least one nozzle located at the cleaning station and positioned above the work station when the work station is adjacent to the cleaning station. The at least one nozzle may selectively direct fluid onto and across the upwardly facing surface. The cleaning station may also comprise at least one sensor positioned to detect a condition corresponding to a presence of the work station at the cleaning station. The cleaning station may also comprise a container positioned at the cleaning station, the container being located adjacent to the work station when the work station is located at the cleaning station. The container may define an opening extending at an angle with respect to the upwardly facing surface of the work station. The system may also comprise a controller operatively connected to the at least one sensor and the at least one nozzle. The controller may be configured to activate the at least one nozzle to disburse fluid onto and across the upwardly facing surface of the work station towards the container responsive to receiving data from the at least one sensor indicating the condition being detected. The fluid may carry any loose impediments positioned on the upwardly facing surface to the container. The fluid and loose impediments may be carried through the opening and into the container. The controller may configured to deactivate the at least one nozzle responsive to receiving data from the at least one sensor indicating the condition is no longer being detected.

BRIEF DESCRIPTION OF THE DRAWINGS

The description herein makes reference to the accompanying drawings wherein like reference numerals refer to like parts throughout the several views, and wherein.

DETAILED DESCRIPTION

The present disclosure describes a system and method for removing loose impediments off of a work station and collecting the loose impediments in a container positioned adjacent to the work station. The loose impediments are removed by directing fluid across the work station and into the container, the fluid carrying with it the loose impediments. The exemplary system and method will be described below with reference to the accompanying figures.

Figure 1:
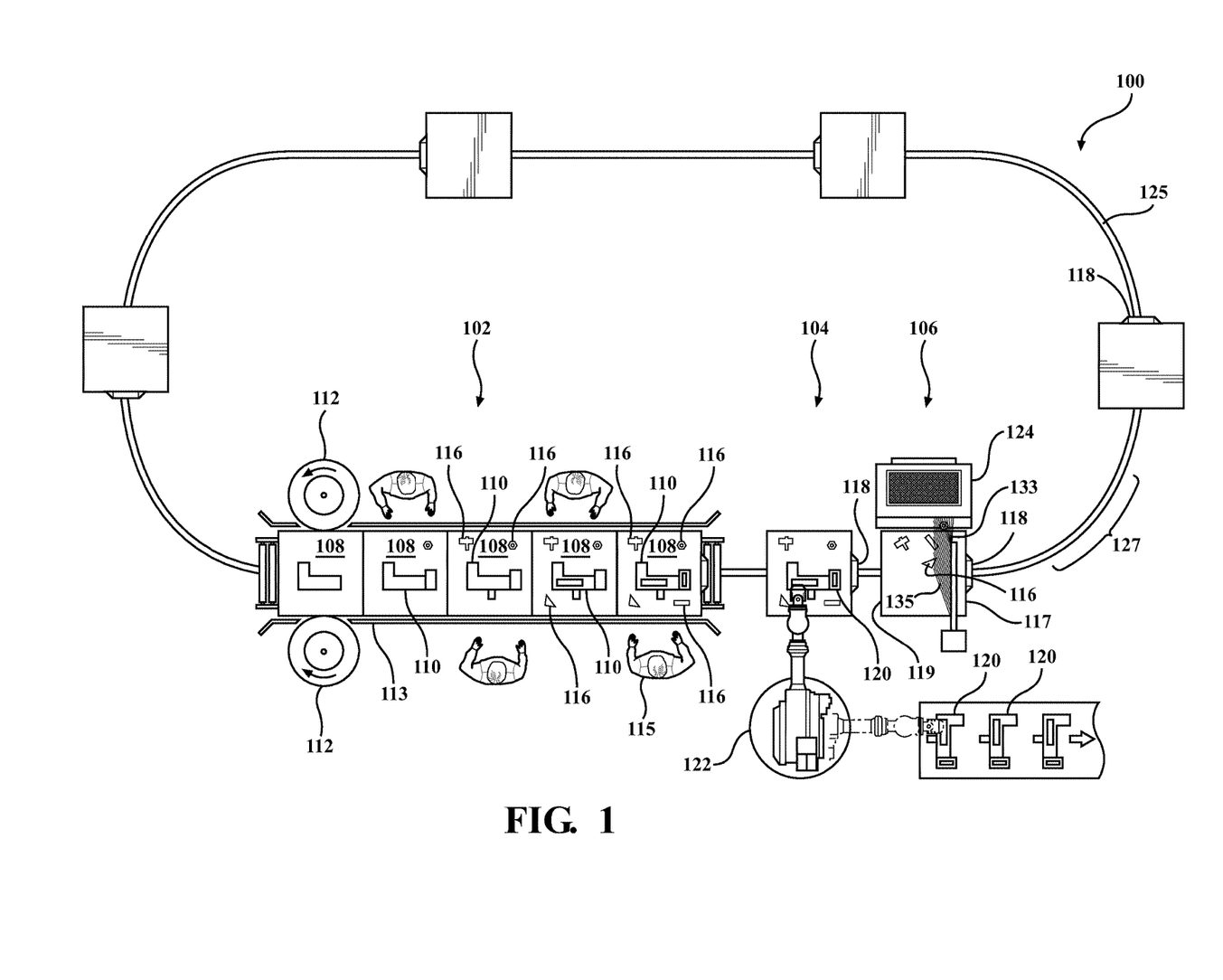
FIG. 1 is a race-track type production line system according to the present disclosure.

Referring to FIG. 1, a production line system 100 is shown. The production line system 100 may include an assembly line 102, a transfer station 104, and a cleaning station 106 including a pneumatic sweeping system 107. Alternatively, the production line system 100 may include the assembly line 102, and the cleaning station 106. The production line system 100 may be a race-track guide-way type production line system 100. It should be noted that the assembly line 102, the transfer station 104, and the cleaning station 106 are fixed positions on the production line system 100.

Figure 2:
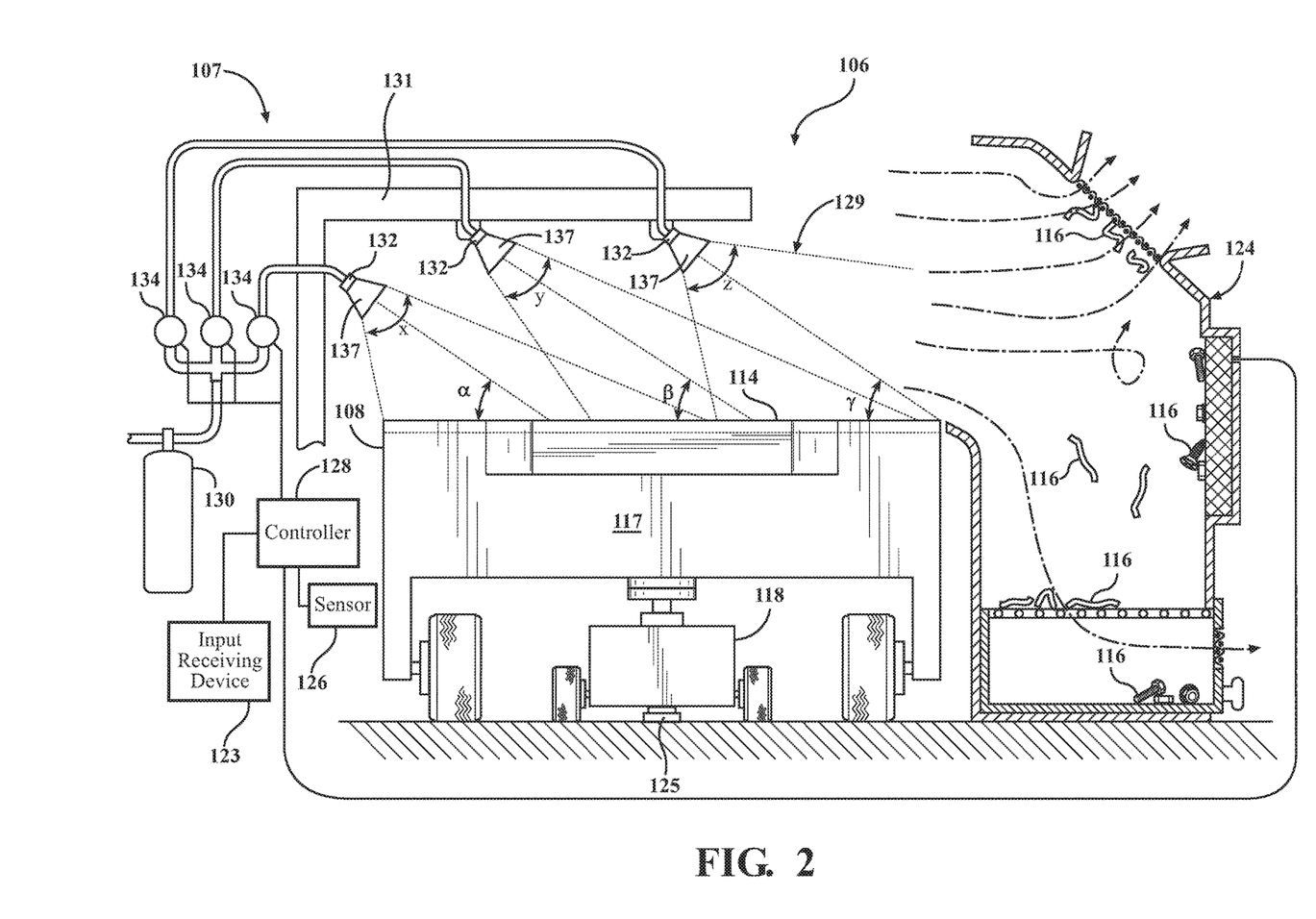
FIG. 2 is a detailed cross-sectional view of a cleaning station of the production line system of FIG. 1 according to the present disclosure.

The production line system 100 further includes one or more work stations 108. The work stations 108 continuously traverse the assembly line 102, the transfer station 104, and the cleaning station 106. The work stations 108 may be sections of a conveyor belt (not shown), discrete pallets, or any substantially planar surface capable of supporting an in-process production element, or a widget 110, being assembled. The work stations 108 may be serially arranged. Each work station 108 may have a support surface, 114 as shown in FIG. 2, which is substantially horizontal and is where the widget 110 is supported as it is processed and assembled. The surface 114 may be made up of a material that is ergonomic to stand and walk on. The material may be but not limited to a soft rubber, a flexible plastic, a soft wood, or any other material that workers may stand on for long periods of time without soreness in their legs. An exemplary material that may be used is an Ergomat® mat on the work station 108. When using pallets as the work station 108, the pallets may be moved through the assembly line 102 via friction or traction drive wheels 112 rotating in opposite directions and shifting the pallets forward along a guideway 113.

As the work stations 108 traverse the assembly line 102, the widget 110 is progressively assembled. The widget 110 may be assembled by autonomous robots (not shown), or by workers 115. At each step of the assembly process, loose impediments 116 may fall onto the surface of the work station 108. Loose impediments 116 may be, but not limited to, fasteners, breakaway tape, plastic, metal shavings, or the like employed as part of or resulting from the assembly process and which at the end of the assembly process are not consumed or affixed to the complete widget. As the widget 110 is assembled, more loose impediments 116 will inevitably fall onto the work station 108.

At the final step of assembly of the widget 110, several loose impediments 116 have fallen onto the work station 108. Once the widget 110 is completely assembled, the widget 110 may be transferred to a different location. The work stations 108 may be moved to the transfer station 104 via a mobile mechanism, such as an autonomous guided vehicle 118 (referred to herein as AGV). Alternatively, the work stations 108 may be moved to the transfer station 104 via a conveyor belt (not shown), a friction drive (not shown), or the like.

The AGV 118 may continuously traverse the production line system 100. The AGV 118 may carry the work station 108 with a fully assembled widget 120 to the transfer station 104, where the fully assembled widget 120 will be removed and taken to a different location in the assembly plant. The AGV 118 may then carry the work station 108 to the cleaning station 106. The AGV 118 may then carry the work station 108 that has been cleaned back to a starting point on the assembly line 102 via a guide-track 125 where the work station 108 will receive a new widget 110 to be assembled. The AGV 118 may then proceed to the end of the assembly line 102, pick up the next work station 108 that has a fully assembled widget 120 and repeat the same process.

When the work stations 108 are transported to the transfer station 104, a transfer means may remove the fully assembled widget 120 from the work station 108 and place it at a different location in the production line system 100 as illustrated in phantom. The transfer means may be a pick-and-place mechanism 122, a worker, an autonomous robot, or any other means of moving a part from one location to another known in the art.

Once the fully assembled widget 120 is removed from the surface 114 of the work station 108 at the transfer station 104, the work station 108, which still has many loose impediments 116 on its surface 114, may be moved to the cleaning station 106. At the cleaning station 106, the loose impediments 116 are blown off the work station 108 into a container 124 positioned adjacent to the work station 108. Once all the loose impediments 116 are blown off the surface 114 of the work station 108 into the container 124, the work station 108 may be transported back to the beginning of the assembly line 102.

Alternatively, it should be appreciated that it may be desirable to clean both the work station 108 and the fully assembled widget 120. The work stations 108 may be transported directly from the assembly line 102 to the cleaning station 106. In this alternative embodiment, the surface of the work station 108 may be cleaned with the fully assembled widget 120 still positioned on the surface. This may be useful when not only the surface of the work station 108 is to be cleaned, but the fully assembled widget 120 itself has loose impediments 116 on its' surface that need to be removed.

It should be appreciated that, although the assembly line 102, the transfer station 104, and the cleaning station 106 are depicted on a straight away stretch defined by guideway 113, they may be positioned anywhere throughout the production line system 100. However, it is preferred that the assembly line 102, the transfer station 104, and the cleaning station 106 be positioned serially on a straight away stretch to lower the possibility of loose impediments 116 falling off of the surface of the work station 108 as the work station 108 changes direction at a corner 127 of the race-track guideway 125.

Referring now to FIG. 2, the cleaning station 106 is shown in greater detail. The cleaning station 106 may include a sensing means 126, a controller 128, a reservoir 130, a support frame 131 having attached thereto at least one nozzle 132, and the container 124.

The sensing means 126 is constantly searching for a condition to be present indicative of the work station 108 being present at the cleaning station 106. The condition may be the sensing means detecting a first point and a second point on the work station 108. The first point on the work station 108 may correspond to a leading edge 117 of the work station 108 and the second point on the work station 108 may correspond to a trailing edge 119 of the work station 108.

The sensing means 126 may be a position sensor detecting the leading edge 117 or the trailing edge 119 of the work station 108, a weight sensor detecting whether there is an increase in weight indicative of the presence of a work station 108, a camera, or any other means for detecting a position of the work station 108 in relation to the cleaning station 106.

The at least one nozzle 132 may be in communication with the reservoir 130 storing pressurized fluid and supported within the cleaning station 106 by the support frame 131. The pressurized fluid may be a liquid fluid or a gaseous fluid. There may also be a valve 134 between the reservoir 130 and the nozzle 132. The valve 134 may be a control valve. The valve 134 may be opened or closed by the controller 128 based on the position of the work station 108 with respect to the cleaning station 106. The valve 134 may also be operative to adjust a pressure at which fluid is directed onto the work station 108. The controller 128 may adjust the pressure according to data it receives from the sensing means 126.

Also, there may be an input receiving device 123 which signals to the controller 128 the type of loose impediments 116 located on the surface of the work station 108, and the controller 128 may adjust the pressure accordingly. The input receiving device 123 may be an additional sensor (not shown) which detects the type of loose impediments on the surface and adjusts the pressure accordingly, or the input receiving device 123 may be used by a worker and information regarding the loose impediments may be manually put into the input receiving device 123 and the pressure adjusted accordingly. Also, the input receiving device 123 may receive data regarding a speed at which the work station 108 is traveling through the cleaning station 106. The input receiving device 123 may adjust the pressure of the fluid as a function of the speed of the surface 114 of the work station 108.

Although three nozzles 132 are shown in FIG. 2, it should be appreciated that as few as one nozzle 132 may be used. Alternatively, as many nozzles 132 may be used as necessary to move loose impediments 116 across the work station 108. Nozzles 132 may be positioned to direct a stream 129 of fluid at an angle α, β, and γ, to the surface. Alternatively, nozzles 132 may be positioned to direct the stream 129 of fluid substantially parallel to the surface 114. The nozzles 132 may have their respective position adjusted by an actuator (not shown) based on data received from the additional sensing means regarding the type of loose impediments 116 located on the surface 114 of the work station 108.

Figure 3:
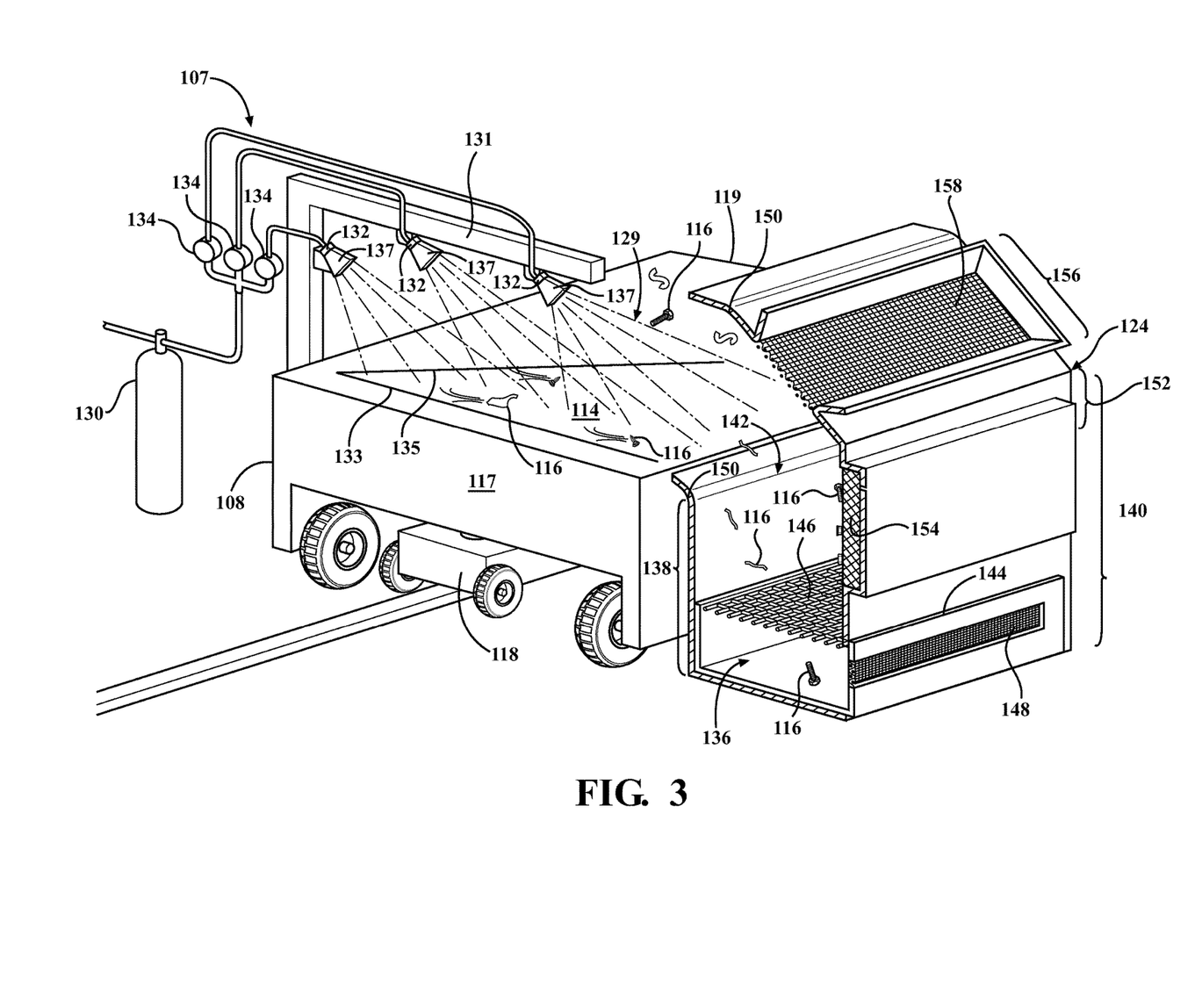
FIG. 3 is a perspective view of the cleaning station of FIG. 2 according to the present disclosure.

The nozzles 132 may also include a plume adjuster 137. The plume adjuster 137 may be used to adjust disbursement, X, Y, and Z, of the stream 129 of pressurized fluid onto the surface. The plume adjuster 137 may also be used to adjust the plume shape, defined by a plume leading edge 133 as shown in FIGS. 1 and 3, and a plume trailing edge 135 as shown in FIGS. 1 and 3. It should be noted that, although the plume shape can be adjusted, it is preferred that the plume leading edge 133 should remain substantially parallel to the leading edge of the work station 108. Maintaining the plume leading edge 133 substantially parallel to the leading edge of the work station 108 ensures that the trajectory of the loose impediments 116 is substantially across the surface 114 of the work station 108 and into the container 124.

The plume adjuster 137 may be adjusted mechanically by a worker. Alternatively, the plume adjuster 137 may be a control valve on the nozzle 132 that is automatically adjusted by the controller 128 based on the type of loose impediments 116 positioned on the surface 114 of the work station 108. The plume adjuster 137 may be adjusted in the same manner as the control valve 134 regulating the pressure of the fluid communicated between the reservoir 130 and the nozzle 132.

When the sensing means 126 senses the condition corresponding to the presence of the work station 108 at the cleaning station 106, the controller 128 may open the valves 134 in order to communicate pressurized fluid from the reservoir 130 to the nozzle 132, and, from the nozzle 132, direct the pressurized fluid onto the surface of the work station 108. As stated above, the condition may be detecting the leading edge of the work station 108, detecting an increase in weight corresponding to a work station 108 being present at the cleaning station 106, or any other means for determining the location of the work station 108 with respect to the cleaning station 106.

As fluid is directed onto the work station 108, the loose impediments 116 may be blown in a direction across the surface substantially parallel to the direction of the fluid being blown onto the surface. The loose impediments 116 may be blown into the container 124 positioned adjacent to the work station 108. The work station 108 may be continuously moved in a direction substantially perpendicular to the direction in which the loose impediments 116 are blown to ensure all loose impediments 116 are blown off the surface of the work station 108 and into the container 124.

It should be appreciated that the direction that in which the loose impediments 116 are blown should be at least perpendicular to the direction that the work station 108 is moving. This insures that the loose impediments 116 continuously move forward towards the container 124 and stay behind the fluid being blown onto the surface. If the loose impediments 116 cross in front of the fluid being blown onto the surface, the loose impediments 116 may remain on the surface as opposed to being blown into the container 124.

The sensing means 126 may constantly be monitoring whether the condition remains present. So long as the condition remains present, the sensing means 126 may indicate to the controller 128 that the condition is still present and that the nozzles 132 should remain open. When the sensing means 126 senses the condition is no longer present indicative that the work station 108 is no longer present at the cleaning station 106, the controller 128 may close the valves 134 in order to shut off the nozzles 132.

Referring to FIG. 3, the container 124 is shown in greater detail through a perspective view. The container 124 may comprise a basin 136, a first side 138, and a second side 140. The first side 138 and second side 140 may be substantially tangential to the surface of the work station 108. The basin 136 is where all the loose impediments 116 are collected and has an opening 142 substantially planar to the work station 108 and aligned with the fluid directed across the work station 108. The first side 138 of the container 124 is positioned directly adjacent to the work station 108. The second side 140 is positioned opposite the basin 136 parallel to the first side 138. The container 124 may also include a flow-inducing means and a sorting means. By flow-inducing means, it may be baffles, slots, or other passages positioned in various locations throughout the container 124 to ensure the fluid communicating across the surface of the work station 108 flows into the container 124 and carries loose impediments 116 with it. By sorting means, it may be devices positioned within the container 124 to separate some loose impediments 116 from others or to position some loose impediments 116 in different locations based on their size, weight, or metallic composition (e.g. magnetic).

The basin 136 of the container 124 may further comprise a drawer 144 for conveniently removing the loose impediments 116 blown off the surface 114 without having to move the container 124 as a whole. The drawer 144 may comprise a slotted filter 146 for allowing smaller loose impediments 116, such as nuts, bolts, screws, and the like, to fall into the drawer 144 and the larger loose impediments 116, such as breakaway tape, and larger pieces of plastic or metal shavings, to remain on top of the slotted filter 146 for easier separation and recycling. Also, the drawer 144 may comprise a basin flow baffle 148. The basin flow baffle 148 allows the fluid directed across the surface and into the container 124 to pass through the lower half of the basin 136 and, thus, direct the loose impediments 116 downward into the basin 136 instead of swirling out of the basin 136 and out of the container 124.

The first side 138 and the second side 140 may include edges 150. The edges 150 may extend at an angle to encourage laminar fluid flow into the container 124.

The second side 140 may also include a backboard 152. The backboard 152 may include an electromagnet 154. The electromagnet 154 may direct magnetic loose impediments 116 downward towards the front of the drawer 144 and make separation and recycling of parts easier. The electromagnet 154 may be connected to and activated by the controller 128 simultaneously with the nozzles 132.

The backboard 152 may also include an extension 156. The extension 156 may extend at an angle from the backboard 152 to encourage fluid flow into the container 124. The extension 156 may also deflect loose impediments 116 blown into the extension 156 downward as opposed to back at the surface. The extension 156 may also include an extension flow baffle 158. The extension flow baffle 158 may also induce the fluid directed across the surface of the work station 108 to flow through the extension 156 creating a venturi effect. The loose impediments 116 blown into the extension 156 would be separated from the fluid being directed across the surface and the loose impediments 116 would be directed downward into the container 124.

Figure 4:
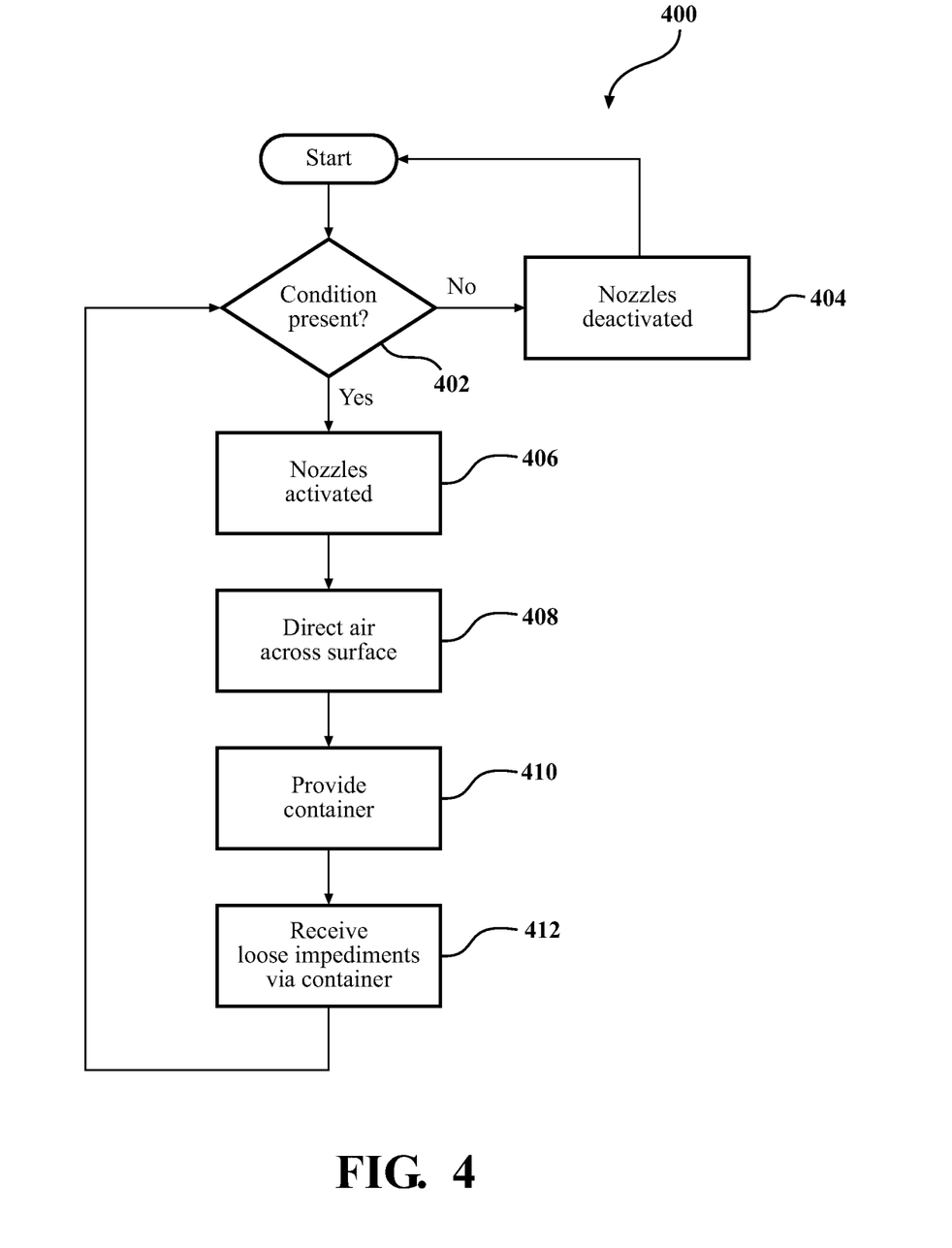
FIG. 4 is a flow diagram depicting a method of operating the cleaning station of FIG. 1 according to the present disclosure.

Referring now to FIG. 4, a control method of controlling the nozzles 132 is depicted through a flow diagram 400 with reference to the structural components disclosed and described above.

In the flow diagram 400, a continuous loop is shown. At logic step 402, the sensing means 126 is waiting for a condition to be present. The condition is indicative of the work station 108 being present at the cleaning station 106. At logic step 404, the nozzles 132 are deactivated until the sensing means 126 determines at step 402 that the condition is present.

When, at logic step 402, the sensing means 126 detects the condition, the sensing means 126 communicates with the controller 128, and, at logic step 406, the controller 128 activates the nozzles 132. The controller 128 may activate the nozzles 132 by opening valves 134 that are connected between the reservoir 130 containing the fluid and the nozzles 132. The valves 134 may be control valves and the controller 128 may adjust the valves 134 to raise or lower a pressure of the fluid directed onto the surface 114 of the work station 108.

At logic step 408, the nozzles 132 direct fluid across the surface 114 of the work station 108. At logic step 410, a container 124 is provided adjacent to the surface 114 of the work station 108 and the container 124 has an opening 142 that is aligned with the directed fluid across the surface 114. At logic step 412, the loose impediments 116 located on the surface 114 of the work station 108 are displaced from the surface 114 of the work station 108 and are received by the container 124.

Logic steps 406, 408, 410 and 412 are continuously looped while the condition remains present at the cleaning station 106. When it is detected that the condition is no longer present at the cleaning station 106, the nozzles 132 are deactivated and the control method proceeds back to logic step 402, where the sensing means 126 waits for the next work station 108 to become present.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the claims, which scope is to be accorded the broadest interpretation so as to encompass all such modifications and equivalent structures as is permitted under the law.

What is claimed is:

1. A method of removing loose impediments from an upwardly facing surface moving along a production line and configured to support a product element, the method comprising:
    sensing a condition indicating a presence of the upwardly facing surface at a cleaning station, the cleaning station including a container that is located adjacent to the upwardly facing surface and defining an opening angled with respect to the upwardly facing surface;
    activating at least one nozzle located at the cleaning station and positioned at a height above the upwardly facing surface, the at least one nozzle directing a stream of fluid from the at least one nozzle onto and across the upwardly facing surface and displacing any loose impediments from the upwardly facing surface into the container via the fluid directed across the upwardly facing surface;
    determining the condition is no longer being sensed; and
    deactivating the at least one nozzle.

2. The method of claim 1, wherein the upwardly facing surface is a portion of a conveyor belt.

3. The method of claim 1, wherein the upwardly facing surface is a surface of a pallet, and wherein the condition indicating the presence of the upwardly facing surface comprises detecting, via a position sensor, a leading edge of the pallet, and wherein determining the condition is no longer being sensed comprises detecting, via the position sensor, a trailing edge of the pallet.

4. The method of claim 1, further comprising opening a valve associated with the at least one nozzle allowing the fluid to move from a reservoir through the at least one nozzle and directed onto the surface.

5. The method of claim 4, wherein the valve is a control valve, and wherein the method further comprises adjusting at least one of a speed at which the fluid is directed onto and across the upwardly facing surface via the control valve, and a disbursement of the fluid onto the surface via a plume adjuster on each of the at least one nozzle.

6. The method of claim 4 wherein the valve is a control valve, and wherein the method further comprises adjusting a speed at which the fluid is directed onto and across the upwardly facing surface as a function of a speed at which the upwardly facing surface is moving through the cleaning station.

7. A system for removing loose impediments from a work station, the system comprising:
    a work station having an upwardly facing surface configured to support a product element, the work station moving along a production line including a cleaning station;
    the cleaning station comprising:
        at least one nozzle located at the cleaning station and positioned above the work station when the work station is adjacent to the cleaning station, the at least one nozzle selectively directing fluid onto and across the upwardly facing surface;
        at least one sensor positioned to detect a condition corresponding to a presence of the work station at the cleaning station; and
        a container positioned at the cleaning station, the container being located adjacent to the work station when the work station is located at the cleaning station, the container defining an opening extending at an angle with respect to the upwardly facing surface of the work station; and
    a controller operatively connected to the at least one sensor and the at least one nozzle, the controller configured to:
        responsive to receiving data from the at least one sensor indicating the condition being detected, activating the at least one nozzle to disburse fluid onto and across the upwardly facing surface of the work station towards the container, the fluid carrying any loose impediments positioned on the upwardly facing surface to the container, the fluid and loose impediments being carried through the opening and into the container; and
        responsive to receiving data from the at least one sensor indicating the condition no longer being detected, deactivating the at least one nozzle.

8. The system of claim 7, wherein the container further comprises:
a first side located adjacent to the work station; and
a second side opposite the first side and extending above the first side.

9. The system of claim 8, wherein the second side includes an electromagnet positioned thereon.

10. The system of claim 9, wherein the electromagnet is operatively connected to the controller, and wherein the controller is further configured to:
responsive to receiving data from the at least one sensor indicating the condition being detected, activating the electromagnet to attract any loose impediments comprising a magnetic material.

11. The system of claim 8, wherein the container further comprises an extension extending from the second side, the extension extending at an angle from the second side towards the first side.

12. The system of claim 11, wherein the extension further comprises flow inducing baffles spanning at least a portion of the extension, and wherein, when the at least one nozzle is activated, the fluid carries the loose impediments positioned on the upwardly facing surface to the container, the fluid and loose impediments being carried through the opening and into the container via air flow into the container caused by the flow inducing baffles on the extension.

13. The system of claim 7, wherein the container further comprises a drawer extendable into the container and having an upwardly facing opening.

14. The system of claim 13, wherein the drawer further includes a basin flow baffle spanning a face of the drawer.

15. The system of claim 13, wherein the drawer further comprises a slotted filter spanning the upwardly facing opening, the slotted filter having slots sized to permit one or more of the loose impediments to fall through the slotted filter and into the drawer while inhibiting one or more other loose impediments from falling through the slotted filter.

16. The system of claim 7, further comprising an input receiving device configured to receive input regarding a type of loose impediment positioned on the upwardly facing surface, wherein the input receiving device is operatively connected to the controller.

17. The system of claim 16, further comprising:
a control valve operatively connected to the at least one nozzle and the controller, the control valve configured to adjust a speed at which the fluid is directed onto and across the upwardly facing surface, and wherein the controller is configured to:
receive, from the input receiving device, the type of loose impediment and, based on the type of loose impediment, adjust the speed at which the fluid is directed onto and across the upwardly facing surface by generating one or more signals for the control valve.

18. The system of claim 16, further comprising:
a plume adjuster operatively connected to the at least one nozzle and the controller, the plume adjuster configured to adjust a disbursement of the fluid onto and across the upwardly facing surface, and wherein the controller is configured to:
receive, from the input receiving device, the type of loose impediment and, based on the type of loose impediment, adjust the disbursement of the fluid onto and across the upwardly facing surface by generating one or more signals for the plume adjuster.

19. The system of claim 7, wherein the work station is a portion of a conveyer belt.

20. The system of claim 7, wherein the work station is a pallet having a leading portion and a trailing portion.

21. The system of claim 20, wherein the condition corresponding to the presence of the work station at the cleaning station comprises:
sensing, via the at least one sensor, the leading portion of the pallet.

22. The system of claim 20, wherein the at least one nozzle is deactivated responsive to sensing the trailing portion of the pallet.

* * * * *